(12) United States Patent
Volk

(10) Patent No.: US 10,480,965 B2
(45) Date of Patent: Nov. 19, 2019

(54) SURFACE MEASURING DEVICE

(71) Applicant: JENOPTIK Industrial Metrology Germany GmbH, Villingen-Schwenningen (DE)

(72) Inventor: Raimund Volk, Villingen-Schwenningen (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 124 days.

(21) Appl. No.: 15/655,565

(22) Filed: Jul. 20, 2017

(65) Prior Publication Data

US 2018/0038716 A1   Feb. 8, 2018

(30) Foreign Application Priority Data

Jul. 20, 2016   (DE) .................. 10 2016 113 398
Nov. 24, 2016   (DE) .................. 10 2016 122 695

(51) Int. Cl.

| G01D 11/14 | (2006.01) |
|---|---|
| G01B 5/28 | (2006.01) |
| G01B 11/30 | (2006.01) |
| G01B 13/22 | (2006.01) |

(52) U.S. Cl.
CPC .............. G01D 11/14 (2013.01); G01B 5/28 (2013.01); G01B 11/30 (2013.01); G01B 13/22 (2013.01)

(58) Field of Classification Search
CPC ...... G01B 11/30; G01B 13/22; G01B 5/0009; G01B 5/008; G01B 5/28; G01D 11/14
See application file for complete search history.

(56) References Cited

U.S. PATENT DOCUMENTS

| 5,285,397 | A | * | 2/1994 | Heier ................ | G01B 11/002 33/503 |
|---|---|---|---|---|---|
| 6,370,788 | B1 | * | 4/2002 | Hellier ............... | G01B 5/012 33/556 |
| 6,490,912 | B1 | | 12/2002 | Volk | |
| 8,334,971 | B2 | | 12/2012 | Keller et al. | |
| 8,336,224 | B2 | | 12/2012 | Arnold | |
| 8,429,829 | B2 | | 4/2013 | Arnold | |
| 8,508,743 | B2 | | 8/2013 | Keller et al. | |
| 8,725,446 | B2 | | 5/2014 | Wegmann | |
| 8,973,280 | B2 | | 3/2015 | Seewig | |
| 9,261,359 | B2 | | 2/2016 | DeCool | |

(Continued)

FOREIGN PATENT DOCUMENTS

DE   10 2010 023 354 A1   12/2011

*Primary Examiner* — Francis C Gray
(74) *Attorney, Agent, or Firm* — Shlesinger, Arkwright & Garvey LLP

(57) ABSTRACT

Surface measuring device for measuring a surface of a workpiece has a device base body, and a measuring probe that by use of a feed apparatus is movable along a feed axis relative to a workpiece to be measured. The measuring probe has a probe base body and a probe element, connected to the probe base body, for scanning the workpiece in the direction of a measuring axis. The probe base body is connected to the measuring device base body via the feed apparatus. An oscillation damper is associated with the measuring probe, and is designed and configured for oscillation rate-dependent damping of oscillations of the probe base body of the measuring probe, and is active between the probe base body and the device base body.

15 Claims, 1 Drawing Sheet

(56) References Cited

U.S. PATENT DOCUMENTS

| | | |
|---|---|---|
| 9,393,663 B2 | 7/2016 | Volk |
| 9,395,310 B2 | 7/2016 | Rudolf |
| 9,562,756 B2 | 2/2017 | Seewig |
| 9,683,914 B2 | 6/2017 | Dietz et al. |
| 9,816,811 B2 | 11/2017 | Riester |
| 9,879,969 B2 | 1/2018 | Volk |
| 9,983,149 B2 * | 5/2018 | Rudolf |
| 2004/0128848 A1 * | 7/2004 | Szenger ............... F16F 7/082 33/561 |
| 2006/0070253 A1 * | 4/2006 | Ruijl .................... G01B 3/008 33/559 |
| 2006/0123649 A1 * | 6/2006 | Muller .................. G01B 7/012 33/559 |
| 2007/0056177 A1 * | 3/2007 | Enderle ................ G01B 7/012 33/561 |
| 2016/0076871 A1 * | 3/2016 | Volz ..................... G01B 7/06 324/227 |

* cited by examiner

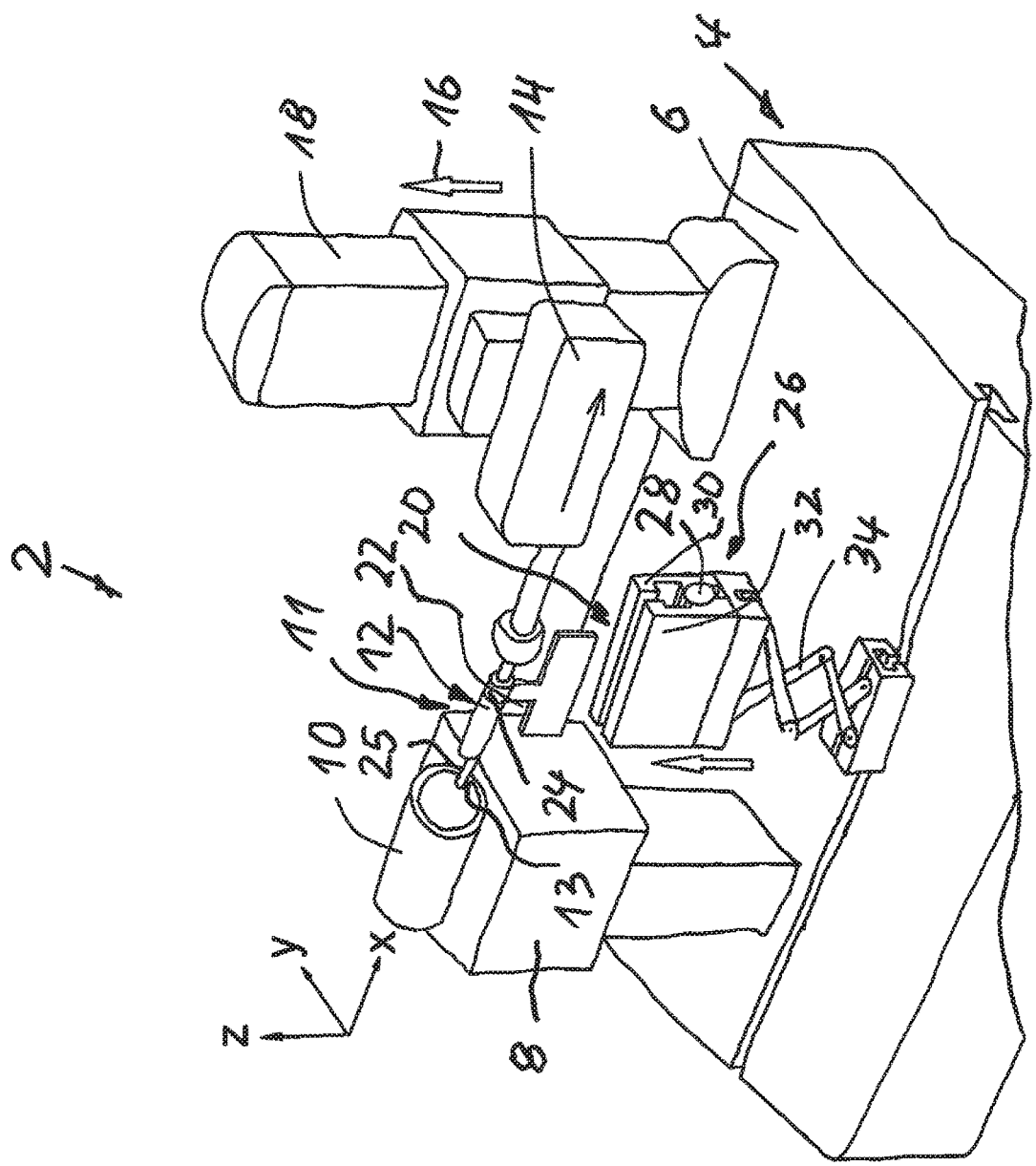

SURFACE MEASURING DEVICE

CROSS-REFERENCE TO RELATED APPLICATIONS

This application claims the priority of German application no. DE 10 2016 113 398.1, filed 20 Jul. 2016, and this application claims the priority of German application no. DE 10 2016 122 695.5, filed 24 Nov. 2016, and each of which is incorporated herein by reference.

FIELD OF THE INVENTION

The present invention relates to a surface measuring device for measuring the surface of a workpiece.

BACKGROUND OF THE INVENTION

These types of surface measuring devices are generally known, and are used for measuring, for example, the contour or roughness of the surface of workpieces.

The measurement of the surface of a workpiece often takes place using moving measuring probes. Tactile mechanical probes or probes that operate without contact, for example distance sensors that operate optically or pneumatically, may be used.

The relatively large measuring circuit is subject to external and internal disturbances which manifest as measurement noise or basic interference. The disturbances occur as oscillations whose component parallel to the probe deflection and perpendicular to the feed direction is superimposed on the sampled workpiece profile as a measurement deviation.

The oscillations are on the one hand externally excited by vibrations that are transmitted via the foundation or through the air to components of the surface measuring device, primarily to the base plate thereof. To prevent further transmission of these oscillations, the base plate is frequently supported with isolation from oscillations, although the extent of the insulation when the surface measuring device is set up in the vicinity of production machines is often not sufficient.

On the other hand, the oscillations are excited by the motor itself or components of a gear system of a feed apparatus of the surface measuring device.

The intensity of the excitation generally increases with increasing feed rate. This component of the oscillations typically dominates the overall disturbances when the measuring station or the surface measuring device is present under laboratory conditions. In contrast, when the surface measuring device is set up near production facilities, the external disturbance component predominates.

The extent to which the probe in the measuring circuit responds to these oscillations is determined primarily by the presence of mechanical resonances or natural oscillations. It is unfavorable when frequency components from the oscillation excitation coincide with resonance lines of the measurement assembly in the frequency band to be transmitted.

Measuring tasks in parts of the automotive industry often require measuring circuits or dimensions in the range of several decimeters. In conjunction with properties such as the modulus of elasticity, damping, and specific weight of the materials used, natural resonances of the measurement assembly at the location of the probe result even at several tens of Hz. However, these frequencies lie completely in the typically used bandwidth of the electrical measuring system. Its limiting frequency is often in the range of approximately 100 Hz, and occurs at even higher frequencies when optical probes are used.

The oscillations that occur thus result in measurement deviations that are superimposed on the useful signal, which corresponds to the profile of the sampled surface. After the measurement, surface characteristic values are computed from a surface profile that is measured by means of the surface measuring device. In particular when the surface measuring device is set up near production facilities, the surface characteristic values determined in this way may be so greatly skewed that an operationally reliable assessment of the surface properties is no longer possible.

In terms of high measuring accuracy, it is therefore desirable to reduce the influence of oscillations on the measuring result to the greatest extent possible.

In terms of reducing the oscillations, a measuring station should have a preferably high natural resonance. In this regard, it is known from DE 10 2010 023 354 A1 to provide measures that result in a more rigid and lightweight design of a probe arm, and that, among other things, have a positive effect even in the range of higher natural oscillations.

Oscillation insulation systems are used against oscillations that are caused by external sources. Such oscillation insulation systems are generally situated between the foundation of the installation site of the surface measuring device and the base plate of the measuring system of the surface measuring device. These types of oscillation insulation systems are often implemented as a combination of soft suspension with respect to a heavy mass. Above the natural resonance of the insulation system, the oscillations introduced into the foundation are further transmitted into the base plate of the measuring system, but in attenuated form.

However, such an oscillation insulation system always provides only one finite damping factor for each excitation frequency. Thus, in the strict sense of the term, the oscillations are not kept away from insulation, and instead are merely further transmitted in attenuated form. As a result, an oscillation insulation system that performs its task under laboratory or measuring room conditions is often no longer sufficient overall for a setup near production facilities.

A further disadvantage of such oscillation insulation systems is that they require a high outlay of construction effort and equipment at the installation site of the measuring station or the surface measuring device. Thus, for mobile surface measuring devices that may be set up at different locations, it is not meaningful to use such oscillation insulation systems.

OBJECTS AND SUMMARY OF THE INVENTION

An object underlying the invention is to provide a surface measuring device which is improved with regard to a reduction of measuring inaccuracies caused by oscillations.

This object is achieved by the invention set forth herein.

The invention provides a surface measuring device having a device base body, and a measuring probe that is movable along a feed axis relative to a workpiece to be measured, the measuring probe having a probe base body and a probe element, situated on the probe base body, for scanning the surface of the workpiece along a measuring axis. According to the invention, oscillation damping means are associated with the measuring probe, and are designed and configured for oscillation rate-dependent damping of oscillations of the probe base body, and are active between the probe base body and the device base body. In this regard, the invention is based on the concept that the effect of oscillations on the measuring accuracy may be reduced in a particularly effective manner when oscillations of the probe base body are damped as a function of the oscillation rate.

For example and in particular, oscillation rate-dependent damping of the oscillations may be achieved particularly easily and effectively in that the oscillation damping means have at least one eddy current brake that acts between the probe base body and the device base body. It has surprisingly been shown that measuring inaccuracies caused by oscillations may be significantly reduced in this way. The invention thus provides an option for achieving a significant improvement in the measuring accuracy of surface measuring devices, with a relatively low equipment outlay.

Suitable eddy current brakes are available as relatively simple, economical standard components, so that the manufacturing costs of a surface measuring device according to the invention are increased only relatively moderately compared to a surface measuring device without an eddy current brake or other oscillation damping means that act as a function of the oscillation rate.

Another advantage of the measuring device according to the invention is that skewing of the measuring signal, which may occur, for example, when filters are used for filtering the measuring signal, is avoided. In addition, it is advantageous that there is little or no impairment of the measurement procedure due to the design according to the invention.

One particular advantage of the invention is that genuine calming of the feed motion is achieved due to the oscillation rate-dependent damping according to the invention.

Moreover, the measurement procedure is not slowed down by the design according to the invention. On the contrary, even higher measuring speeds are possible due to the calming of the feed motion achieved according to the invention.

The principle of oscillation damping used according to the invention is universally usable for various measuring devices.

One particularly great positive effect of the design according to the invention results when the measuring device is used near production facilities, i.e., when the component of oscillations externally introduced into the measuring device is particularly high.

The oscillation damping used according to the invention may also be designed in such a way that it acts directly on the axes of the measuring device.

Retrofitting existing measuring devices with oscillation damping means according to the invention is easily possible.

In principle, according to the invention any suitable oscillation damping means may be provided, i.e., also oscillation damping means in which there is a mechanical connection between the probe and the base body of the surface measuring device. In order for the measuring function of the probe element, and in particular for a tactilely operating probe, its deflectability corresponding to the surface shape of the workpiece to be measured, to be impaired as little as possible, it is advantageous for the oscillation damping means to be designed as oscillation damping means that operate without contact, which provides an advantageous further embodiment of the invention.

One extremely advantageous further embodiment of the invention provides that the oscillation damping means have at least one eddy current brake that acts between the probe base body and the device base body. This results in the advantages and properties described above.

The eddy current brake advantageously acts along the measuring axis, i.e., for a probe having a tactile probe element, in the direction of the deflection of the measuring element, during the measuring operation. If the feed axis is the x axis, for example, whereby the probe is deflected along the z axis as the measuring axis, the eddy current brake may be active along the z axis.

Depending on the particular circumstances of the surface measuring device, and in particular of the feed axis of a feed apparatus of the surface measuring device, the eddy current brake may be active along any given suitable axis, for example a rotational axis. In this regard, one advantageous further embodiment of the invention provides that the eddy current brake is active along a linear axis.

An eddy current brake has an eddy current body, made of electrically conductive material, that cooperates with a magnet system having at least one magnet. In other respects, the design and operating principle of an eddy current brake are generally known to those skilled in the art, and therefore are not explained in greater detail here.

According to the invention, it is possible in principle for the probe base body of the measuring probe to be connected, in terms of oscillation, to the magnet system, and for the eddy current body to be connected, in terms of oscillation, to the device base body of the surface measuring device, also referred to below as measuring device for short. However, in order to burden the measuring probe with as little additional weight as possible, another advantageous further embodiment provides that the eddy current brake has an eddy current body that is connected, in terms of oscillation, to the probe base body, and that cooperates with a magnet system that has at least one magnet and is connected, in terms of oscillation, to the device base body.

According to the invention, the term "connection in terms of oscillation" is understood to mean that the components in question are directly connected, or are connected to one another with other components in between, in such a way that oscillations are transmitted between the components to an extent such that the eddy current brake is active for damping the oscillations.

One advantageous further embodiment of the above-mentioned embodiment provides that the eddy current body is connected to the probe base body, in particular to a probe element holder or probe housing, of the measuring probe. It is particularly preferred according to the invention to fasten the eddy current body to the probe element holder, i.e., to the mechanical-electrical interface, at which the probe element may be exchanged relative to the feed apparatus. It is advantageous when the point of introduction of the forces causing the oscillations is defined by an electrical conductor that is fastened in the area of the probe bearing.

Another advantageous further embodiment provides that the eddy current body is designed as an eddy current plate, and that the magnet system is accommodated or accommodatable between pole shoes of the magnet system.

The shape, size, and configuration of the eddy current body and of the magnet system are selectable within wide limits, depending on the particular circumstances. To ensure that the eddy current brake becomes active solely, or at least predominantly, in the desired direction, and to prevent eddy currents from undesirably acting in the direction along the feed axis, another advantageous further embodiment of the embodiment with the eddy current plate provides that the extension of the eddy current plate along the feed axis is less than the extension of the pole shoes, such that during feed motion in the direction of the axis, the eddy current plate is always completely accommodated between the pole shoes of the magnet system.

According to another advantageous further embodiment of the invention, the magnet of the magnet system is magnetized in such a way that the magnetic field lines extend perpendicularly or essentially perpendicularly with respect to the feed axis and to the measuring axis of the measuring probe. If, for example, the feed axis is the x axis and the measuring axis is the z axis, the magnet is magnetized in such a way that the magnetic field lines extend in the y direction.

In principle, the eddy current body and the magnet system may be situated relative to one another on the components of the surface measuring device in such a way that the eddy current brake is always active. However, one advantageous further embodiment of the invention provides that the magnet system is situated on the base body so as to be adjustable relative to the eddy current body via an adjustment device. By means of the adjustment device, the magnet system may be adjusted relative to the eddy current body between an engaged position in which the eddy current brake is active, and a neutral position in which the eddy current brake is inactive. In this embodiment, the measuring device may thus be operated with or without oscillation damping, depending on the particular requirements.

In order to track the eddy current brake during a spatial adjustment of the measuring axis for measuring devices whose feed axis is spatially adjustable, one advantageous further embodiment of the above-mentioned embodiment provides that the feed apparatus is designed in such a way that the feed axis is spatially adjustable, wherein the magnet system, in terms of adjustment, is coupled to the feed axis in such a way that the magnet system is also adjusted during a spatial adjustment of the feed axis.

Any suitable measuring probes may be used for the measuring device according to the invention. In this regard, one advantageous further embodiment of the invention provides that the measuring probe is a tactile measuring probe having a probe element that is movably supported relative to the probe base body, or is a measuring probe that operates without contact, in particular an optical or pneumatic distance sensor.

One extremely advantageous further embodiment of the invention provides that the eddy current brake 20 is designed for asymmetrical action, such that the damping effect is stronger, preferably significantly stronger, in the direction of the measuring axis than in the directions transverse to the measuring axis, in particular along the feed axis. In this way, oscillations of the probe base body along the measuring axis may be damped and the influence of such oscillations on the measuring accuracy may be reduced, while along the feed axis there is no damping of the feed motion, or if so, only to a negligible extent in terms of the measuring accuracy.

The invention is explained in greater detail below with reference to the appended highly schematic drawing, which illustrates one embodiment of a surface measuring device according to the invention. All features described in the description, illustrated in the drawing, and claimed in the patent claims, alone or in any suitable combination, constitute the subject matter of the invention, regardless of their recapitulation in the patent claims or the dependent claims, and regardless of their description or illustration in the drawing. The subject matter and disclosed content also encompass subcombinations of the claims in which features of the claims are omitted and/or replaced by other features.

Relative terms such as up, down, left, and right are for convenience only and are not intended to be limiting.

BRIEF DESCRIPTION OF THE DRAWINGS

The single FIGURE of the drawing illustrates a highly schematic perspective view of one embodiment of a surface measuring device 2 according to the invention.

DETAILED DESCRIPTION OF THE INVENTION

The single FIGURE of the drawing illustrates a highly schematic perspective view of one embodiment of a surface measuring device 2 according to the invention, also referred to below as measuring device 2 for short. The measuring device 2 has a base body 4, or base 4 in short, with a base plate 6, to which a holder 8 for a workpiece 10 to be measured is connected.

The measuring device 2 also has a measuring probe 11 for scanning the surface of the workpiece 10. The measuring probe 11 has a probe base body or probe body 12 in short, and in the present embodiment is designed as a tactile measuring probe which has a probe element, for example in the form of a probe tip, that is movable relative to the probe base body 12.

The probe element 13 is deflectable along the z axis (measuring axis), and is movable relative to the workpiece 10 along a feed axis, which in the present embodiment corresponds to the x axis, by means of a feed apparatus 14 connected to the probe base body 12. During a measurement, the measuring probe 11 is moved along the feed axis by means of the feed apparatus 14, whereby the probe element 13 scans the surface, and each location-dependent deflection of a probe element 13 of the measuring probe 11 is recorded as a measured value.

Based on the recorded measured values, the shape of the surface of the workpiece 10 may then be reconstructed in an evaluation apparatus, not illustrated. Particulars of the design of such a measuring device and such a measuring probe and the detection of the measured values and the reconstruction of the surface are generally known to those skilled in the art, and therefore are not explained in greater detail here.

To be able to position the measuring probe 11 vertically, i.e., along the measuring axis (z axis), relative to the workpiece 10, the feed apparatus 14 together with the measuring probe 11 is height-adjustably situated on a measuring column 18, as symbolized by an arrow 16.

According to the invention, oscillation damping means, such as an oscillation damper, are associated with the measuring probe 11, and are designed and configured for oscillation rate-dependent damping of oscillations of the measuring probe 11, and are active between the probe base body 12 and the device base body 14.

In the illustrated embodiment, the oscillation damping means have an eddy current brake 20 that acts between the probe base body 12 and the base body 4. In the illustrated embodiment, the eddy current brake 20 has an eddy current body 22 that is connected, in terms of oscillation, to the probe base body 12, and which in the present embodiment is formed by a plate-shaped electrical conductor (eddy current plate). In the illustrated embodiment, the connection, in terms of oscillation, between the probe base body 12 and the eddy current body 22 is formed by fastening the eddy current body 22 to a probe holder 24 for the probe element 13. The probe element 13 is exchangeably connected to the probe holder 24 via a probe arm 25. As is apparent from the drawing, the eddy current body 22 extends in parallel to the z-x plane.

The eddy current brake 20 also has a magnet system 26 which is connected, in terms of oscillation, to the device base body 4, and which in the illustrated embodiment has a cylindrical magnet 28 with pole shoes 30, 32. The magnet 28 is magnetized in such a way that the magnetic field lines extend in the y direction.

The magnet system 26 is height-adjustably connected to the base plate 6 via an adjustment device 34.

During operation of the measuring device, the eddy current body 22 moves in the space between the pole shoes 30, 32. During a movement of the eddy current body 22 along the z axis, eddy currents arise which cause the eddy current brake 20 to become active. To avoid eddy current forces that could undesirably act in the x direction, the length of the eddy current body 22 along the x axis is dimensioned in such a way that the eddy current body 22 is always completely accommodated between the pole shoes 30, 32 during a feed motion along the feed axis (x axis). Thus, the surface portion of the eddy current body 22 situated between the pole shoes 30, 32 experiences no change in the magnetic field over time, thus avoiding generation of eddy current forces in the x direction.

The operating principle of the surface measuring device 2 according to the invention is as follows:

As the result of unwanted oscillations of the probe base body 12 together with the eddy current body 22 fastened thereto which occur during a measurement, the eddy current body 22 briefly departs from z direction of the magnetic field between the pole shoes 30, 32 and once again descends. This effect, viewed in the opposite direction, takes place at the lower and upper edges in the z direction. The change in the magnetic field over time in these descending and ascending surface sections results in the formation of eddy currents, which build up a magnetic field that counteracts the static magnetic field of the magnet 28. This results in speed-proportional braking forces for oscillations in the z direction, i.e., in the direction of the measuring axis, which have a damping effect on the amplitude of the oscillations.

The influence of oscillations of the probe base body 12 on the measuring result is reduced in this way, thus improving the measuring accuracy of the measuring device 2.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A surface measuring device for measuring a surface of a workpiece comprising:
   a) a device base body;
   b) a measuring probe that by means of a feed apparatus is movable along a feed axis relative to a workpiece to be measured, the measuring probe having a probe base body on which a probe element, for scanning the workpiece in the direction of the feed axis, is situated, the measuring probe being connected to the device base body via the feed apparatus and being deflectable along a measuring axis;
   c) an oscillation damper is associated with the measuring probe and is configured for oscillation rate-dependent damping of oscillations of the probe base body, and is active between the probe base body and the device base body;
   d) the feed axis is perpendicular to the measuring axis;
   e) the oscillation damper has an eddy current brake that acts between the probe base body and the device base body; and
   f) the eddy current brake is configured for asymmetrical action, such that the damping effect of the eddy current brake is stronger in the direction along the measuring axis than in the direction along the feed axis.

2. The surface measuring device according claim 1, wherein:
   a) the oscillation damper operates without contact.

3. The surface measuring device according to claim 1, wherein:
   a) the eddy current brake is active along the measuring axis.

4. The surface measuring device according to claim 1, wherein:
   a) the eddy current brake is active along a linear axis.

5. The surface measuring device according to claim 1, wherein:
   a) the eddy current brake has an eddy current body, made of electrically conductive material, which is connected, in terms of oscillation, to the probe base body and which cooperates with a magnet system that has a magnet and is connected, in terms of oscillation, to the device base body.

6. The surface measuring device according to claim 5, wherein:
   a) the probe base body is one of a probe element holder and
   a probe housing; and
   b) the eddy current body is connected to the one of the probe element holder and the probe housing of the measuring probe.

7. The surface measuring device according to claim 5, wherein:
   a) the eddy current body is an eddy current plate that is accommodated or accommodatable between pole shoes of the magnet system.

8. The surface measuring device according to claim 7, wherein:
   a) an extension of the eddy current plate along the feed axis is less than an extension of the pole shoes, such that during feed motion in the direction of the axis, the eddy current plate is always completely accommodated between the pole shoes of the magnet system.

9. The surface measuring device according to claim 5, wherein:
   a) the magnet of the magnet system is magnetized in such a way that the magnetic field lines extend perpendicularly or essentially perpendicularly with respect to the feed axis and to the measuring axis of the measuring probe.

10. The surface measuring device according to claim 5, wherein:
    a) the magnet system is situated on the device base body so as to be adjustable relative to the eddy current body via an adjustment device.

11. The surface measuring device according to claim 5, wherein:
    a) the feed apparatus is spatially adjustable, and the magnet system, in terms of adjustment, is coupled to the feed axis in such a way that the magnet system is also adjusted during a spatial adjustment of the feed axis.

12. The surface measuring device according to claim 1, wherein:

a) the measuring probe is a tactile measuring probe having a probe element that is one of movably supported relative to the probe base body, or is a measuring probe that operates without contact, an optical or pneumatic distance sensor.

13. The surface measuring device according to claim 2, wherein:
a) the oscillation damper has an eddy current brake that acts between the probe base body and the device base body.

14. The surface measuring device according to claim 12, wherein:
a) the measuring probe operates without contact and is one of an optical and a pneumatic distance sensor.

15. The surface measuring device according to claim 1, wherein:
a) the damping effect of the eddy current brake is stronger in the direction along the measuring axis than in directions transverse to the measuring axis.

* * * * *